United States Patent [19]

Tucker

[11] Patent Number: 4,781,810

[45] Date of Patent: Nov. 1, 1988

[54] ADVANCED CHLORINE GENERATING SYSTEM

[76] Inventor: Daniel M. Tucker, 1054 E. Shary Cir., Concord, Calif. 94518

[21] Appl. No.: 97,049

[22] Filed: Sep. 16, 1987

[51] Int. Cl.$^4$ .............................................. C25B 15/00
[52] U.S. Cl. .................................. 204/228; 204/263; 204/266
[58] Field of Search ............... 204/232, 237, 263, 130, 204/98, 128, 149, 151, 228, 95, 266

[56] References Cited

U.S. PATENT DOCUMENTS

| | | | |
|---|---|---|---|
| 3,390,065 | 6/1968 | Cooper | 204/95 |
| 3,682,190 | 8/1972 | Patil et al. | 204/95 |
| 4,129,493 | 12/1978 | Tighe et al. | 204/95 |

Primary Examiner—R. L. Andrews
Attorney, Agent, or Firm—Roger A. Marrs

[57] ABSTRACT

A chlorine generating apparatus is disclosed herein by which chlorine gas or sodium hyperchlorite is generated in small quantities from a brine solution economically enough to be practical for use in the backyard swimming pool. The apparatus includes a free standing unit and cell utilizing only salt as its raw material to generate the chlorine required. The chlorine generating cell incorporates a chemical pump for forcibly urging the resulting product to the pool without the use of mechanical pumps or membranes. A device is included whereby hardness minerals are prevented from being deposited within the cell. New methods of reducing maintenance and increasing reliability are also disclosed.

8 Claims, 3 Drawing Sheets

1

ADVANCED CHLORINE GENERATING SYSTEM

BACKGROUND OF THE INVENTION

1. Field of the Invention

The present invention relates to an apparatus and method for generating sodium hyperchlorite, sodium hydroxide, and/or chlorine gas from a brine solution in small quantities to be suitable and economical for backyard swimming pool use. The concept can also be expanded for larger commercial installations. The purpose of the invention is to replace the need to haul dangerous, toxic and poisionous chemicals from a store to the pool owner's home where they are stored and might accidentally cause damage or loss of human life, and to eliminate the need to continuously dispense these chemicals in uncertain proportions into the swimming pool.

2. Brief Description of the Prior Art

It is a well known fact that for a swimming pool to be used safely the water must be sterile. In addition, if proper disinfectant or algaecide is not applied, the growth of algae will damage the pool surface and clog the pool filters. More often than not the home swimming pool is a breeding ground for disease. Several current methods of chlorinating the home swimming pool are now in use.

One method is the adding of liquid chlorine, normally a diluted solution of sodium hyperchlorite. This is carried from the store in gallon bottles and dispensed manually by the user.

Another method is the use of powdered chlorine chemicals which may be added by hand or dispensed through a means of a hopper, or supplied in stick form which slowly dissolves into the pool water, either in a dispensing container or in some sort of floating element that rides on the pool surface Yet another method which is becoming more popular, even though it presents the greatest hazards, is the use of gas chlorine. Normally, a service man chlorinates the pool once a week by dispensing chlorine gas into the water and adding soda ash (sodium hydroxide) or some equivalent base to counteract the acid produced by the chlorine. Since the dispensing of the chlorine gas is done infrequently, i.e. once per week, the chlorine level is raised to a very high point at that time so that it will not drop below that required to maintain proper pool function within a weeks time. This very high initial concentration of chlorine in the water adversely affects swimmer's tans and bleaches hair as well as bathing suits.

In all these instances, caustic chemicals must be transported to the pool site and many cases of bottled or boxed chemicals are left stored where they can be accidentally reached by children.

Many prior attempts have been made to generate the chlorine at the pool site. The most commonof these utilizes salt within the pool water itself and bypasses a small portion of the filter flow through an electrolysis cell which generates the chlorine. This prior system has not been satisfactory due to the continuous problem of the hardness minerals within the pool water precipitating and eventually clogging and damaging the cell. A number of methods have been employed by which this hardness could be removed through acid washing of the cell between pool use. However, this procedure requires complex automatic equipment or manual operation by the pool owner. In the former case, the equipment is too elaborate and complex to be practical for the home use application. In the latter case, the pool owner often as not would forget to operate the equipment and the cell would be destroyed. The problem was further compounded by the large amount of salt that had to be added to the pool water, bringing the salinity content to the point where corrosion and electrolysis in the pool's plumbing system were often out of control.

Another objection to previous unit is the amount of electricity required to operate the electrolysis cell since the salt concentration within the cell has to be kept low, usually less than 0.25%. A great deal of the electrical energy went into the production of hydrogen and oxygen, a wasteful by-product in this application. With the cost of energy steadily increasing, this method of production is simply not cost effective.

SUMMARY OF THE INVENTION

These and other objectives are achieved in accordance with the present invention by providing a tank in which a concentrated brine solution is maintained. Water from the local utility, noticeably softer than pool water, is subjected to a water softening means removing all of the hardness elements before it is presented to the cathode side of an electrolysis cell which is located submerged within the brine solution. The electrolysis cell is separated into two sections by an ion selective membrane. One section contains the cathode, the other the anode. The ion selective membrane will pass only sodium and hydrogen ions which flow from the anode to the cathode side of the cell. Sodium hydroxide and hydrogen are generated on the cathode side of the membrane and chlorine gas and oxygen are generated on the anode side of the membrane. The water that supplies the cathode side is drawn from the output of the water softening means directly such that salt is not consumed on the cathode side. Only a very small amount of water is needed for this. Water is drawn for the anode side from the bottom of the brine tank where maximum concentration of brine can be obtained. The generation of the gas bubbles within the cell, chlorine and oxygen (anode side) and hydrogen (cathode side), produces a pumping action to drive the water out of the cell. The anode output enters a unique dewatering device where the chlorine gas is separated from the brine solution which is then returned to the bottom of the tank. The chlorine gas then enters a manifold where is combines with fresh water and the sodium hydroxide solution from the cathode side and is dispensed to the swimming pool in the form of dilute sodium hyperchlorite, the most appropriate sterilizing means available.

The electrolysis within the cell is accomplished by passing current through the cell which is generated by a power supply that forms an integral part of the apparatus.

By generating sterilizing media on site on a continuous basis, the invention also provides sanitation and protection far in excess of that normally afforded in home pool usage. Operation of the invention is easily understood and the unit may be rapidly installed by moderately skilled labor and operated by the normal unskilled homeowner.

OBJECTS OF THE INVENTION

It is among the primary objects of this invention to provide a device which develops chlorine and its sterilizing by-products directly from a concentrated brine solution and to dispense them into a swimming pool for sterilization purposes.

It is the further object of this invention to make such dispensation in a steady and consistent manner in order to maintain proper sterility at all times.

It is yet another object of this invention to control the pH of the pool water for comfortable swimming and effective sterilization at all times as well as preventing undue attack on the pool's plumbing system.

It is yet still another object of this invention to do this in such a manner as to draw only a small amount of electrical power and to make the entire process cost effective in comparison with other methods of pool chlorination.

A further object of this invention is to provide cool, maintenance free operation of the power supply.

A still further object of this invention is to eliminate mechanical moving parts and to allow the gas generation within the cell to supply the maximum pumping action possible.

Another object of this invention is to accomplish all of the above objects in an automatic manner which requires a minimum of maintenance and skill on the part of the owner and operator.

Another object of this invention is to provide a system that may be installed in a minimum of time with a minimum of training and skill on the part of the installer.

Yet still another object of the present invention is to provide novel means for adjusting the pH of the pool water either up or down a scale within a desirable range.

A final object of this invention is to accomplish all of the above in a completely automatic manner with only water and salt (NaCl) required.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

The following detailed description is of the best presently contemplated modes of carrying out the invention. This description is not to be taken in a limiting sense but is made merely for the purpose of illustrating the general principles of the invention since the scope of the invention is being defined by the appended claims.

Figure 1:
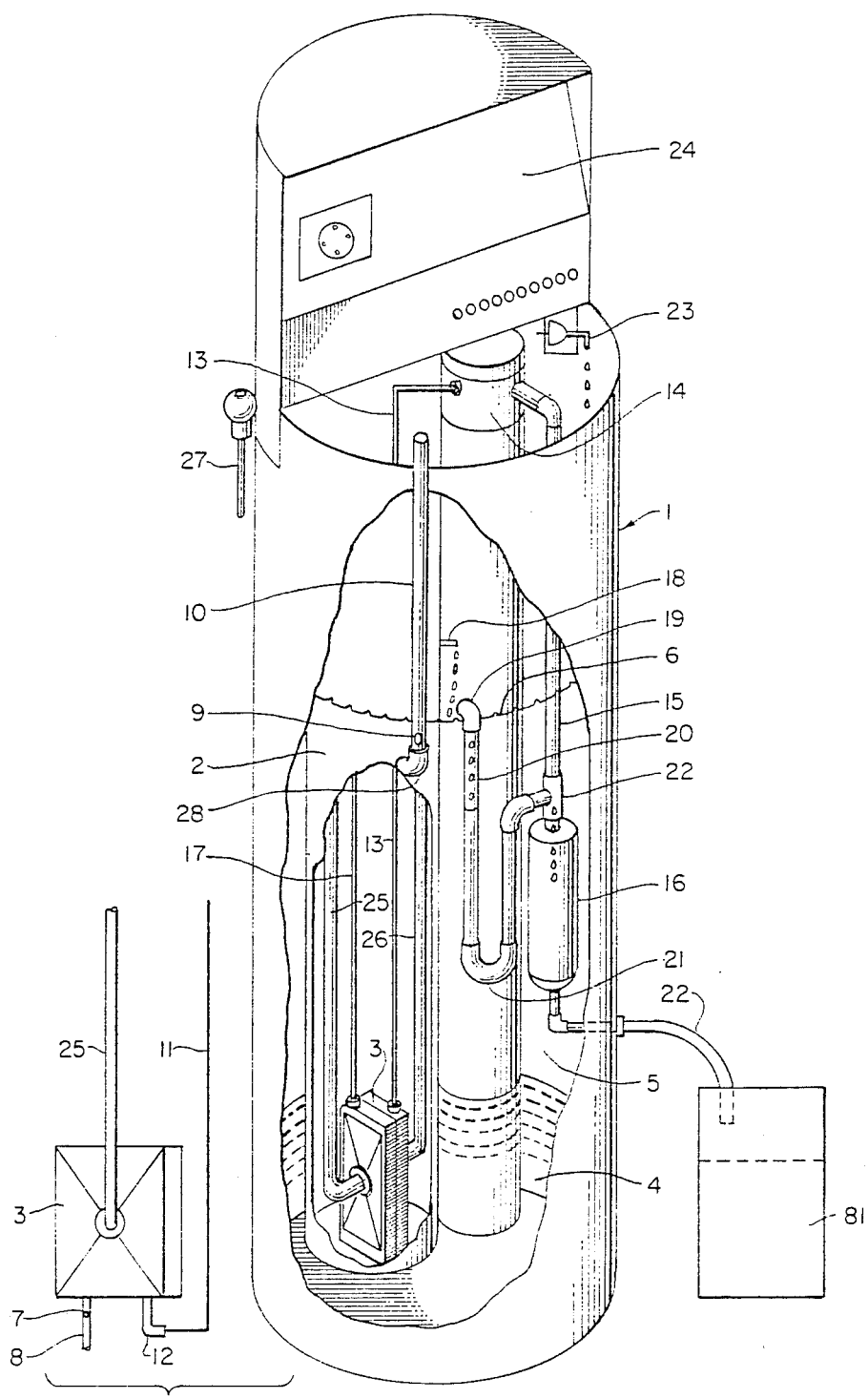
FIG. 1 depicts a cutaway view showing the basic components of the system and their interconnections incorporating the present invention.

Referring now to FIG. 1, which can be seen as a cutaway view of the full chlorinator unit, all of the components are contained within a housing, 1. Within that housing is a second smaller housing 2 in which the electrolytic cell 3 is placed. Housing 1 also contains a liquid in three phases, as shown by the shaded demarcation areas: 4, 5, and 6. At the very bottom, beneath layer 4, will be solid, undissolved sodium chloride, or salt. The area between 4 and 5 will be a saturated solution of this salt. The area between 5 and the surface 6 will be a mixture of sodium hydroxide and fresh water. The bottom of inner housing 2 is roughed or notched such that only the saturated brine solution may flow through and fill the inside of container 2 thus immersing cell 3 in said saturated salt solution.

Cell 3 is a conventional membrane-type cell, as claimed in previous patents, with anode and cathode compartments separated by an ion-exchange membrane which will allow only hydrogen and sodium ions to pass. The saturated salt solution enters the anode side of the electrolysis cell 3 at the bottom. A small hole 7 in stand-off tube 8, allows impurities to settle to the bottom of housing 1 and not be pumped into anode chamber of cell 3. A hole 9 in the cleaning tube 10, which is below the surface of the sodium hydroxide solution 6, allows this liquid to flow through the cleaning tube 10 to the bottom of the cell 3 through tube 11 via the elbow 12 at the bottom of the cathode compartment of electrolysis cell 3. Since hardness minerals will not stay dissolved in a solution of sodium hydroxide, this solution is free of such minerals and therefore may be drawn into the cathode compartment of said electrolytic cell without the concern that these hardness minerals be deposited on said cathode.

Chlorine gas, along with the oxygen, is generated in the anode compartment while hydrogen gas is generated in the cathode compartment along with sodium hydroxide. The invention relies upon the action of these gases to forcibly move the fluids from both compartments. This pumping action has been previously claimed in U.S. Pat. No. 4,500,404 by the same inventor. The improvement disclosed herein involves the use of the inner compartment 2 to allow the electrolytic cell to be placed at the very bottom of the unit, even below the level where the undissolved salt resides.

Experimentation has shown that as the liquid pressure is increased by lowering the cell, the pumping action is greatly facilitated due to the higher gas pressure. Gas and concentrated salt solution from the anode compartment of the cell are pumped through tube 13 to the dewatering device 14. This tube 14 is long and extends all the way to the bottom of the container where the concentrated brine solution is returned for another pass through the cell. The remaining chlorine gas, and whatever oxygen there is, passes from the top of the separator 14 through tube 15 to mixing chamber 16. Hydrogen gas and sodium hydroxide are pumped from the cathode side of the cell through tube 17 and are returned to the surface of the tank solution through tube 18. The hydrogen dissipates rapidly to the atmosphere.

The height of the liquid in the housing 1 is determined by the skimming action of skimmer fitting 19. Sodium hydroxide and fresh water are drawn from the surface of the solution through skimmer 19, tube 20, trap 21 to tee 22 where it enters the mixing chamber 16. Chlorine gas comes in through tube 15. The flow in and through the mixing chamber allows enough time for the chlorine gas to combine with the sodium hydroxide solution to form sodium hyperchlorite, the liquid chlorine normally used to sterilize swimming pools. While the unit is operating fresh water from the local utility is constantly dripped into the chamber through dripper valve 23. Where this fresh water strikes the surface of the sodium hydroxide solution, most hardness elements are precipitated to the bottom of the tank. Since very little water is used in this system, this softening action is sufficient for many areas of the country as the amount of hardness element that builds up in the bottom of the tank can be flushed away on an annual basis. In some areas, where the water is exceptionally hard, further softening and/or maintenance may be required as will be discussed shortly.

Electrical energy, in the form of DC voltage and current, is supplied to electrolytic cell 3 from the power supply 24 that rests on top of container 1. Electrical connection for the anode side comes through tube 25 while the electrical connection for the cathode side comes through tube 26. Separate tubes are used so that the electrical connection is not exposed to any form of the solutions in the container. Once the connections have been made and the wire holding tubes connected to the cell, they are filled with a chemically inert and moisture resistant foam, preventing any contact whatsoever by these connections with any outside chemicals.

In some hard water areas, not all the hardness is precipitated to the bottom of the tank before a portion is drawn into hole 9 of tube 10 to feed the cathode side of the cell. In this event, over a period of perhaps a few months, hardness minerals can build up within the cell. A maintenance procedure for the owner-operator is provided to alleviate this problem. The owner removes syringe 27, which is resting outside power supply 24. Cleaning tube 10 is removed from elbow 28, turned over and reinserted. Now, hole 9 is above the liquid level of the tank and nothing may flow from the fluid in the tank into the cell. The owner then uses the syringe 27 to draw some conventional pool acid from a bottle and squirt it into tube 10 such that the acid becomes the source of liquid for the cathode side of the cell. This acid is followed by a syringe of the water drawn from the surface 6 of the housing. This solution is gravity fed into the cell and dissolves away any hardness build-up. After allowing the acid to remain within the cell for a specified period of time, particularly to make sure that tube 10 is empty, tube 10 is removed and reversed such that hole 9 will again be below the liquid level and supply the sodium hydroxide solution to the cathode side of the cell.

Figure 2:
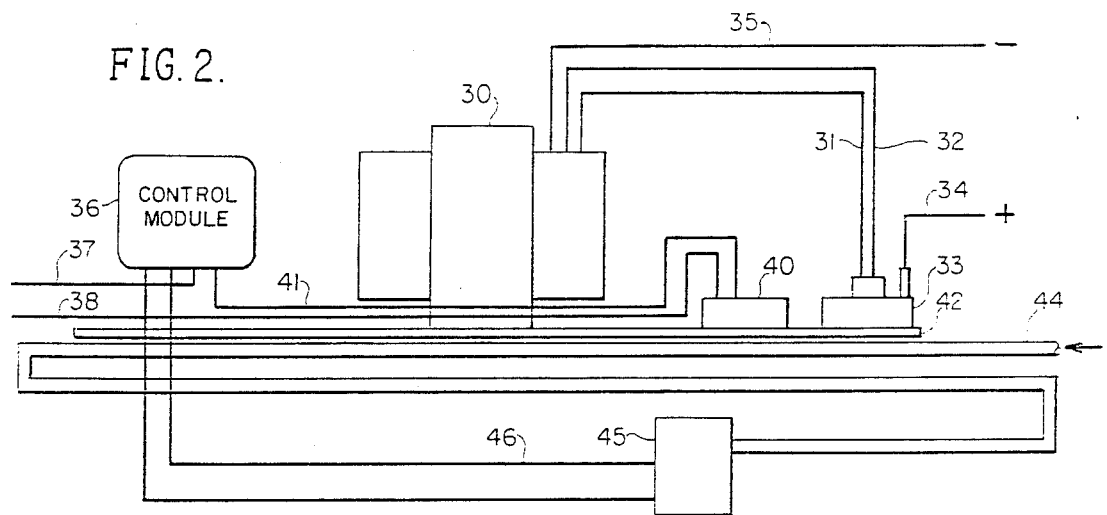
FIG. 2 illustrates a method of water cooling and improving reliability of the unit.

Referring now to FIG. 2 we see a portion of the power supply circuit, the main element of which is power transformer 30. Output from the secondary of power transformer 30 is connected by lines 31 and 32 to rectifier assembly 33. The output of rectifier assembly 33 at point 34 supplies the positive side of cell 3 of FIG. 1, (as previously described) through tube 25. The cathode side of cell 3 is connected to line 35 via tube 26 of FIG. 1. The amount of energy delivered to cell 3 is regulated by control module 36, connected in series with the primary of transformer 30, allowing only the desired current to flow. Main power enters the unit on lines 37 and 38. Line 37 is connected directly to control module 36, while line 38 is connected through thermal switch 40 and back to the control module via line 41.

Transformer 30, diode assembly 33 and thermal switch 40 are all mounted together on a plate 42 which is in thermal condition with tube 43. When the fresh water enters the unit it connects to tube 43 at point 44. The water flows through the tube to solenoid valve 45 which is controlled by control module 36 through line 46. When the unit is on, valve 45 is open, allowing the water to pass through to the dripper valve 23 of FIG. 1. Since both transformer 30 and diode assembly 33 generate considerable heat, the water flowing through tube 43 effectively draws away this heat and cools the unit. Should the source of fresh water fail for any reason the unit will continue to operate, generating chlorine gas without the continued liquid flow to provide the sodium hydroxide, thus only chlorine gas might be fed to the system. In many instances the presence of the gas not only creates a substantial acid level pH but also attacks plumbing and pool pump parts.

To prevent this occurence and also to protect transformer 30 from overheating, thermal switch 40 senses the temperature of the heat conducting plate 42. Should water fail to flow in tube 43 the heat generated by transformer 30 and diode assembly 33 will cause plate 42 to rise to a temperature that will cause thermal switch 40 to open, shutting off the unit. This protects transformer 30 and prevents unwanted generation of chlorine gas. The cooling of transformer 30 and diode assembly 31 also improves the reliability of the unit.

Figure 3:
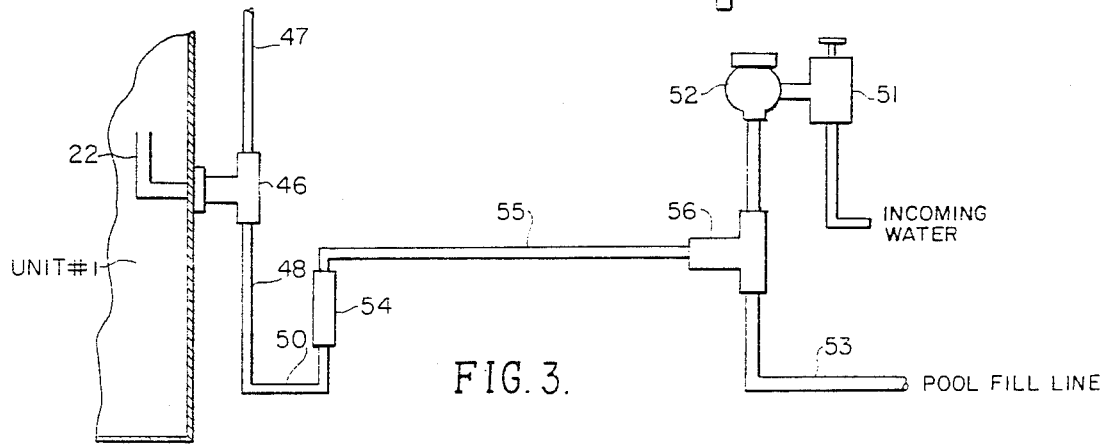
FIG. 3 typically illustrates one method of connection to a swimming pool utilizing the fill line.

FIG. 3 discloses one method of supplying the sterilizing output of the invention unit to the swimming pool via a connection to the swimming pool fill line. Output of the unit, as discussed under FIG. 1, leaves at tube 22 shown connected to tee fitting 46. The top of the tee fitting connects to vent line 47 which is high enough to be well above any level normally encountered by a human being. Since some oxygen is generated in the process it is eliminated here at vent 47. The liquid sodium hyperchlorite passes downward through tube 48 and trap 50. Trap 50 remains filled with liquid preventing gas from being drawn into the fill line via line 55 connected at tee 56.

The above described connection provides a safety feature also in the event of the previously discussed possibility of water failure causing only chlorine gas to be produced. In this instance it is not desirable to have the gas go into the fill line as it might cause damage. Trap 50 in combination with vent 47 forces the chlorine gas to exit through the vent and be dissipated to the atmosphere where no damage can be done. When the pool is being filled by the opening of valve 51, water is supplied through vacuum breaker 52 and pool fillline 53. Water is prevented from flowing backward into the unit by check valve 54 connected in line 55 between the fill line connected to 56 and the trap 50.

Figure 4:
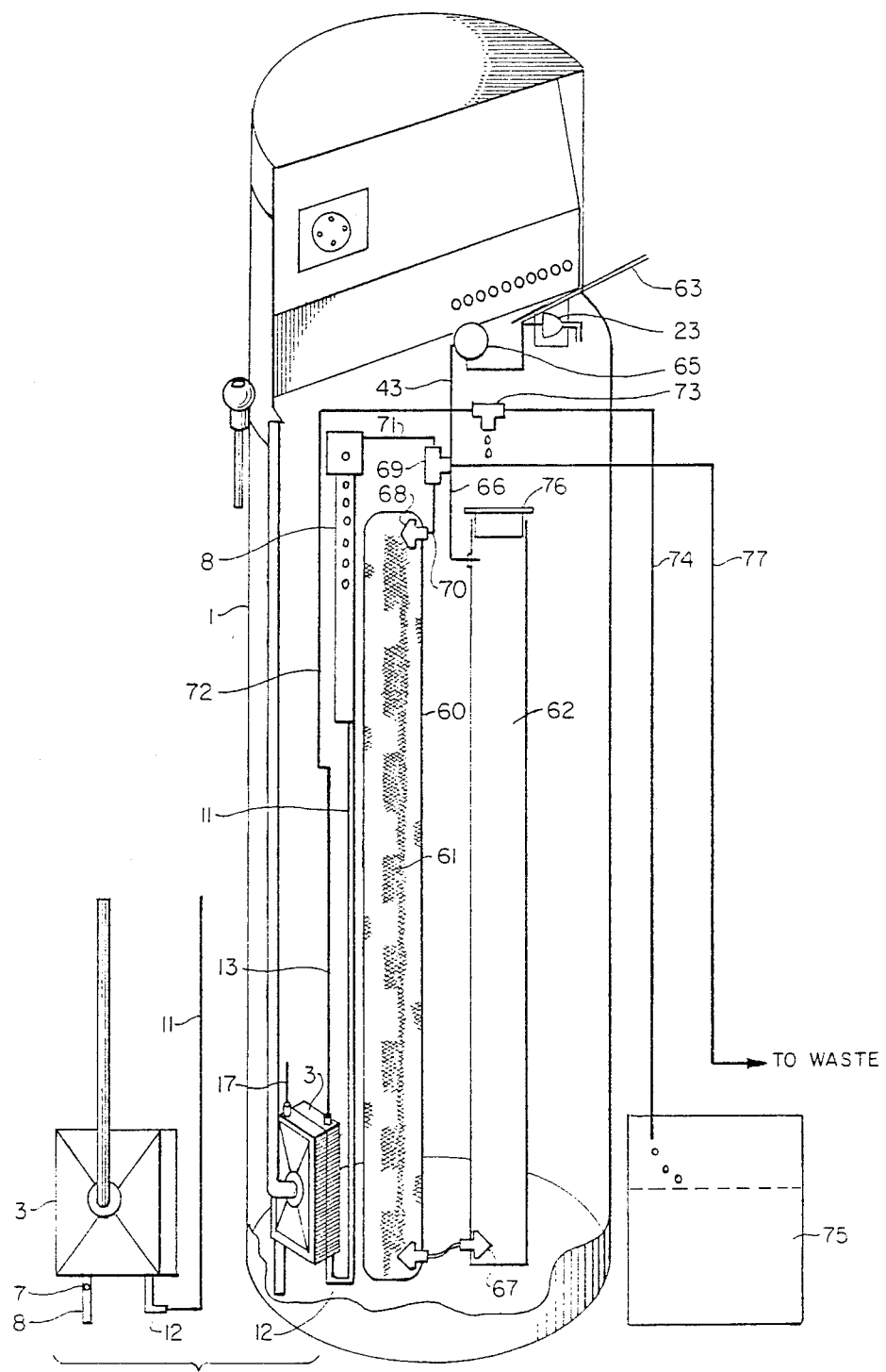
FIG. 4 indicates a diagram of a method for addition of water softening in the event of very hard water conditions.

Referring now to FIG. 4 we see an expanded view of the container 1 of FIG. 1. A portion of the parts have been omitted for simplicity in explaining the operation of the components shown (most particularly, the components associated with the anode side of cell 3). The components shown in previous figures have the same number assignments as in this figure. In areas of exceptionally hard water it is necessary to add an additional softening means for the water that passes through the cathode side of the electrolysis cell. This means is shown as a container 60 which is filled with ion exchange resin 61 and placed inside of housing 1. In addition, a salt and filter cartridge 62 is placed inside the housing 1. The fresh water 63 entering the unit at 44 through tube 43 and passes through a screen 67 at the bottom of the filter cartridge 62 and then flows to the bottom of the container 60 up through ion exchange resin 61 then through solenoid valve 45 to dripper valve 23 where the flow is controlled as it drips into the tank.

With the implementation of the subject invention as shown in FIG. 4 a tee 64 is placed between solenoid valve 45 and dripper valve 23. The other side of tee 64 is connected to needle valve 65. The needle valve 65 adjusts the flow of the water through tube 66 into the salt and filter cartridge 62. Since a very minute amount of water is required in the cathode side of cell 3 for proper operation, the needle valve is used to restrict the flow so that the amount of water to be softened is greatly reduced and the resin will last for an extended perior of time before it needs to be backwashed or replaced. As the water moves through resin bed 61 all of the hardness ions are exchanged for sodium ions. The water leaves the ion exchange bed through strainer 68 and tube 70 to drip into tube 8 which feeds the solution to the cathode side of cell 3 via tube 11 and tube 71.

The output of the cathode side of cell 3 is fed by tube 72 to 73. If the tee 74 is faced up, the fluid will pass through tube 74 to waste or caustic holding tank 75. If the tee 73 is faced down more and more of the fluid drips back to the surface of the tank. Thus by controlling the setting of the tee 73 the amount of hydroxide solution that is returned to the pool vs. stored in the holding tank or spent to waste may be controlled, thereby adjusting the pH of the swimming pool. If all of the hydroxide solution is returned to the swimming pool, in most cases the pH will tend to rise too high due to the fact that some of the chlorine gas is lost. Also, many pools tend to have a naturally high pH due to either the pH of the local water or of the pool plaster. The presence the tee 73 allows for compensation for the effect of such external influences.

At a periodic time, calculated to be shorter than the time required for the ion exchange resin 61 to become saturated with hardness minerals, or as part of a regular service routine, the top 76 of the salt filter cartridge 62 is removed and container 62 is filled with salt. Needle valve 65, and 3-way valve 69, are opened fully and concentrated brine solution is allowed to flow through the ion exchange resin 61 recharging it with sodium ions and forcing the hardness ions out, all at one time, so that they do not have time to deposit in cell 3. Tube 77 is directed to waste until the salt in cartridge 62 has fully dissolved. Once this has occurred both needle valve 65 and 3-way valve 69 are readjusted to their proper settings and operation commences as before.

Figure 5:
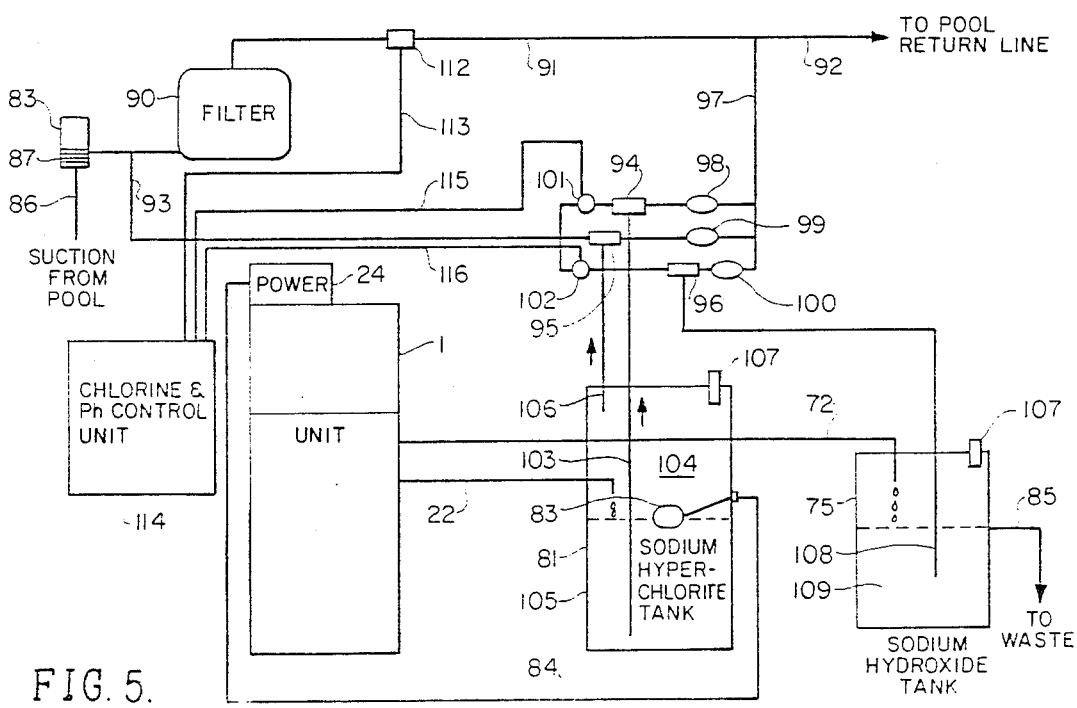
FIG. 5 illustrates a system using the subject invention in a novel connection to completely automate a water sterilization and pH system.

Referring now to FIG. 5 we see the subject invention connected as part of an overall system to control both the chlorine and the pH of a swimming pool, or like body of water, completely automatically. The output 22 of the unit 1 of FIG. 1 is fed to sodium hyperchlorite holding container 81. Line 72 of FIG. 4 is directed to sodium hydroxide holding container 75. The output of the cathode side of cell 3, line 72, passes through tee 73, which is adjusted so that the larger portion of sodium hydroxide solution passes out of unit 1 through tube 72 to holding tank 75. Unit 1 continues to operate until level sensor 83 determines that container 81 is full. This sense signal if fed by line 84 back to power supply 24, shutting off the unit until the level in container 81 drops low enough to require additional liquid chlorine. In virtually all instances more liquid chlorine will be required by a swimming pool than sodium hydroxide, therefore the hydroxide tank 75 is filled by a line 72 until it reaches the overflow to waste line 85. This line conducts any additional sodium hydroxide to waste, maintaining the level in container 75.

Water comes from the pool via suction line 86 through strainer 87 (to remove any large particles), through pump 88, filter 90 and line 91 to the pool return line 92. A small portion of the high pressure water on the pump side of the filter is diverted by a line 93 to venturi suction devices 94, 95 and 96. This high pressure water passes through the three venturies and is returned to the low pressure pool return line via line 97. The action of venturi 94 creates a suction at input 103. Check valves 98, 99, and 100 are installed after each venturi 94, 95 and 96 before the venturi's discharge enters the low pressure pool return line 97 to prevent water from flowing backwards out of the venturi should it become non-functional or when solenoid valves 101, 102 close. High pressure water going through venturi 94 creates suction at input 103 to remove the sodium hyperchlorite 104 from the sodium hyperchlorite container 81. In the same manner, venturi 95 creats suction at 106 to remove any gases that might collect and inject them into pool return line 97. A vent 107 allows air to equalize the pressure when products are removed from either the sodium hyperchlorite tank 105 or the sodium hydroxide tank 75. In the same manner, venturi 96 creates suction at 108 and removes the sodium hydroxide solution 109 from sodium hydroxide tank 75 and injects it into pool return line 97. An overflow conduit 85 allows excess sodium hydroxide solution to flow to waste.

Solenoid valves 101 or 102 control the suction of either the sodium hyperchlorite or the sodium hydroxide into the pool. Sensor 112 in the pool return line 91 determines both the pH and chlorine level of the exiting filtered pool water returning to the pool. Sensor 112 may be one or two sensors depending upon construction. The information is fed from the sensors by line 113 to chlorine and pH control unit 114. Should the chlorine level get below the desired amount, a signal on line 115 will open solenoid valve 101 allowing venturi 94 to draw sodium hyperchlorite through pickup tube 103, through check valve 98, and inject it into pool return line 97. In the same manner, should the pH of the pool become too low a signal, line 116 from the control unit will open solenoid valve 102, drawing sodium hydroxide solution via pickup tube 108 through venturi 96 and check valve 100, and inject into pool return line 97. Both the pH and the chlorine sterilization level can be automatically maintained with the only two raw materials required—salt and water.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:
1. A chlorine generating device comprising:
  a tank containing a mixture of sodium chloride salt and water with an adequate amount of said sodium chloride such that a portion of the sodium chloride will remain in the solid solid state allowing the water to become a saturated solution of said sodium chloride;
  a hollow tube extending from above the liquid line to the bottom of said tank to create a space from which the solid sodium chloride is excluded, opening means at the bottom of said hollow tube to allow the tube to fill with the said saturated solution of sodium chloride only;

an electrolytic cell submerged at the bottom of said hollow tube, said electrolytic cell having and anode side and a cathode side separated by an ion selective membrane which will allow the passageof hydrogen and sodium ions only, the anode side of said electrolytic cell provided with an opening at its lowest point to allow entry of said saturated solution of sodium chloride;

a source of fresh water supplying said chlorine generating device with a small portion of said fresh water passing through an ion exchange resin bed, for the removal of the hardness ions, as the exclusive source of liquid for the cathode side of said electrolytic cell;

a source of direct current and voltage, the positive output thereof connected to the anode of said electrolytic cell and the negative output thereof connected to the cathode of said electrolytic cell;

means for conducting the clorine gas along with the entrained solution of sodium chloride to a separation means such that the sodium chloride solution is returned to the bottom of said tank and the chlorine gas is conducted to a mixing means; and a further means for conducting the hydrogen gas and the entrained sodium hydroxide solution generated at the cathode of said electrolytic cell to the surface of the solution in said tank to allow the hydrogen gas to escape to the atmosphere while allowing the sodium hydroxide to concentrate on said surface to be skimmed off and conducted to said mixing means where the chlorine gas is combined therewith to produce sodium hypochlorite.

2. A chlorine generating device according to claim 1 wherein:

said source of direct current and voltage contains electronic components, which at a minimum comprise a transformer and rectifier diodes, to convert the normally available alternating current and voltage to the required direct current and voltage, the heat generated in their process of operation being drawn away by the incoming fresh water supply as it replenishes the water used by said chlorine generating device.

3. A chlorine generating device according to claim 2 wherein:

a thermally sensitive switch is included among said electronic components operatively connected to interrupt said source of direct current and voltage in the event the temperature of said electronic components rises above a predetermined point.

4. A chlorine generating device comprising:

a tank containing a mixture of sodium chloride salt and water with an adequate amount of said sodium chloride such that a portion of the sodium chloride will remain in the solid state allowing the water to become a saturated solution of said sodium chloride;

a hollow tube extending from above the liquid line to the bottom of said tank to create a space from which the solid sodium chloride is excluded, opening means at the bottom of said hollow tube to allow the tube to fill with the said saturated solution of sodium chloride only;

an electrolytic cell submerged at the bottom of said hollow tube, said electrolytic cell having and anode side and a cathode side separated by an ion selective membrane which will allow the passage of hydrogen and sodium ions only, the anode side of said electrolytic cell provided with an opening at its lowest point to allow entry of said saturated solution of sodium chloride;

a source of direct current and voltage, the positive output thereof connected to the anode of said electrolytic cell and the negative output thereof connected to the cathode of said electrolytic cell;

means for conducting the chlorine gas along with the entrained solution of sodium chloride to a separation means such that the sodium chloride solution is returned to the bottom of said tank and the chlorine gas is conducted to a mixing means;

a further means for conducting the hydrogen gas and the entrained sodium hydroxide solution generated at the cathode of said electrolytic cell to the surface of the solution in said tank to allow the hydrogen gas to escape to the atmosphere while allowing the sodium hydroxide to concentrate on said surface to be skimmed off and conducted to said mixing means where the chlorine gas is combined therewith to produce sodium hypochlorite; and said source of direct current and voltage contains electronic components, which at a minimum comprise a transformer and rectifier diodes, to convert the normally available alternating current and voltage to the required direct current and voltage, the heat generated in their process of operation being drawn away by the incoming fresh water supply as it replenishes the water used by said chlorine generating device.

5. A chlorine generating device according to claim 4 wherein:

a thermally sensitive switch is included among said electronic components operativly connected to interrupt said source of direct current and voltage in the event the temperature of said electronic components rises above a predetermined point.

6. A chlorine generating device according to claim 1 wherein;

said solution of sodium hypochlorite is vended to the body of water to be treated by entering the center of a vertically mounted tee fitting, the upper side of which is connected to a tube which conducts any gasses not dissolved in the liquid away to the atmosphere, the lower side of said tee fitting is connected to a trap formed by a 'U' tube filled with liquid to block any gasses, the other side of said trap being connected through a check valve, allowing flow only away from said chlorine generating device, to the body of water to be treated.

7. A water sterilization and alkalinity control system comprising:

a tank containing a mixture of sodium chloride salt and water with an adequate amount of said sodium chloride such that a portion of the sodium chloride will remain in the solid state allowing the water to become a saturated solution of said sodium chloride;

a hollow tube extending from above the liquid line to the bottom of said tank to create a space from which the solid sodium chloride is excluded, opening means at the bottom of said hollow tube to allow the tube to fill with the said saturated solution of sodium chloride only;

an electrolytic cell submerged at the bottom of said hollow tube, said electrolytic cell having and anode side and a cathode side separated by an ion selective membrane which will allow the passage of hydrogen and sodium ionsonly, the anode side of said electrolytic cell provided with an opening at its lowest point to allow entry of said saturated solution of sodium chloride;

a source of direct current and voltage, the positive output thereof connected to the anode of said electrolytic cell and the negative output thereof connected to the cathode of said electrolytic cell;

means for conducting the chlorine gas along with the entrained solution of sodium chloride to a separation means to return the sodium chloride solution to the bottom of said tank with the chlorine gas conducted to a mixing means;

a further means for conducting the hydrogen gas and the entrained sodium hydroxide solution generated at the cathode of said electrolytic cell to a second separation means to allow the hydrogen gas to escape to the atmosphere while conducting a portion the sodium hydroxide to said mixing means where the chlorine gas is combined therewith to produce sodium hypochlorite;

a first storage container to hold the said sodium hypochlorite, said container equipped with a means to detect when said container is full and shut off said water sterilization and alkalinity control system;

8. A water sterilization and alkalinity control system according to claim 7 wherein:

a second storage contaner is provided into which the portion of the sodium hydroxide not used to generate sodium hypochlorite is allowed to accumulate, said container having an overflow to waste;

two venturi fittings, the pressure side of each connected through two solenoid valves to the pressure side of the filter in the circulation system of the water to be treated, the output of each venturi fitting connected through a check valve to the lower pressure return line of said circulation system;

the suction input of the first venturi connected to draw sodium hypochlorite from the first storage container when the solenoid valve on its pressure side is caused to open, the second venturi having its suction input connected to a line so arranged to draw sodium hydroxide from the second storage container when the solenoid valve connected to its pressure side is caused to open;

a chlorine and alkalinity sensing means connected to sense the chlorine and alkalinity levels of the water to be treated as it flows through its filter system, said sensing means connected to a control unit whereby the appropriate solenoid valve is caused to open to adjust the water's chlorine and alkalinity to predetermined levels.

* * * * *